(12) United States Patent
Artmann

(10) Patent No.: US 8,354,196 B2
(45) Date of Patent: Jan. 15, 2013

(54) FUEL CELL UNIT INCLUDING A STORAGE UNIT FOR STORING AND PROVIDING LIQUID WATER COOLANT

(75) Inventor: Reinhard Artmann, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/968,920

(22) Filed: Dec. 15, 2010

(65) Prior Publication Data

US 2011/0081590 A1    Apr. 7, 2011

Related U.S. Application Data

(63) Continuation of application No. PCT/EP2009/004533, filed on Jun. 23, 2009.

(30) Foreign Application Priority Data

Jun. 27, 2008   (DE) .......................... 10 2008 030 567

(51) Int. Cl.
    *H01M 8/04* (2006.01)
(52) U.S. Cl. ......... 429/437; 429/433; 429/434; 429/436
(58) Field of Classification Search .................. None
    See application file for complete search history.

(56) References Cited

U.S. PATENT DOCUMENTS

| | | | |
|---|---|---|---|
| 5,836,269 A | 11/1998 | Schneider | |
| 5,868,105 A | 2/1999 | Evans | |
| 6,432,568 B1 | 8/2002 | Salvador et al. | |
| 6,521,373 B1 * | 2/2003 | Suzuki et al. | 429/162 |
| 7,090,940 B2 | 8/2006 | Schrooten et al. | |
| 2001/0053470 A1 * | 12/2001 | Misumi | 429/26 |
| 2003/0039875 A1 * | 2/2003 | Horiguchi et al. | 429/26 |
| 2006/0083968 A1 | 4/2006 | Inai et al. | |
| 2008/0063902 A1 | 3/2008 | Kawasaki et al. | |
| 2008/0102327 A1 | 5/2008 | Docter et al. | |
| 2009/0130529 A1 * | 5/2009 | Yamamoto et al. | 429/34 |

FOREIGN PATENT DOCUMENTS

| | | |
|---|---|---|
| DE | 37 18 697 A1 | 12/1987 |
| DE | 196 07 638 C1 | 6/1997 |
| DE | 102 13 134 A1 | 10/2003 |
| DE | 11 2004 002 139 T5 | 10/2006 |
| DE | 103 17 123 B4 | 9/2007 |
| JP | 2000-149970 * | 5/2000 |
| JP | 2000-208158 A | 7/2000 |
| WO | WO 2005/119825 A2 | 12/2005 |

OTHER PUBLICATIONS

International Search Report dated Aug. 13, 2009 with English translation (four (4) pages).
German Search Report dated Feb. 10, 2009 with partial English translation (nine (9) pages).

* cited by examiner

*Primary Examiner* — Ula C Ruddock
*Assistant Examiner* — Tony Chuo
(74) *Attorney, Agent, or Firm* — Crowell & Moring LLP

(57) ABSTRACT

A fuel cell unit is provided having at least one fuel cell to which is connected a coolant circuit associated with a storage unit for storing and providing liquid water coolant at the fuel cell both under normal operating conditions and under frost conditions. The storage unit is set to provide a smaller amount of liquid water coolant under frost conditions than under normal operating conditions.

8 Claims, 1 Drawing Sheet

FUEL CELL UNIT INCLUDING A STORAGE UNIT FOR STORING AND PROVIDING LIQUID WATER COOLANT

CROSS-REFERENCE TO RELATED APPLICATIONS

This application is a continuation of PCT International Application No. PCT/EP2009/004533, filed Jun. 23, 2009, which claims priority under 35 U.S.C. §119 to German Patent Application No. DE 10 2008 030 567.7, filed Jun. 27, 2008, the entire disclosures of which are herein expressly incorporated by reference.

BACKGROUND AND SUMMARY OF THE INVENTION

The invention relates to a fuel cell unit having at least one fuel cell, to which is connected a cooling circuit associated with a storage unit for storing and providing liquid water coolant to the fuel cell both under normal operating conditions and under frost conditions. Furthermore, the invention relates to a method for operating a fuel cell unit, in which method water coolant stored in a reservoir assigned to a cooling circuit is conveyed to at least one fuel cell by way of the cooling circuit.

As examples of the aforementioned fuel cell units, DE 103 17 123 B4 discloses a fuel cell comprising a cold-start device, and DE 11 2004 002 139 T5 discloses a freeze-tolerant fuel cell power plant. In such fuel cell units, an extended shutdown time and, additionally the action of frost, results in freezing of the water coolant located in a storage unit of the associated cooling circuit. For starting the fuel cell unit it is necessary to melt the frozen water coolant, for which purpose a heating element, particularly in the form of a heater or a heat exchanger, is provided. In this connection, it is important that the holding capacity of the storage unit be adapted to suit the water requirement of the fuel cell unit in normal operating conditions. At the same time, there exists the problem that the process of melting or thawing of the frozen water coolant necessitates the supply of a comparatively great deal of energy and also takes up a comparatively long period of time until the water coolant is thawed and the fuel cell unit can thus be started.

US 2008/0063902 A1 discloses a fuel cell unit in which the water coolant is discharged not only from the fuel cell but also from a reservoir for the water coolant when there is a risk of frost. However, this makes it necessary to refill this reservoir at a later point in time, which basically represents additional outlay.

It is an object of the invention to provide a fuel cell unit and a method for operating a fuel cell unit, which fuel cell unit and method overcome the aforementioned disadvantages and, particularly, enable the fuel cell unit to be started more rapidly following an extended shutdown time and action of frost.

This object is achieved according to the invention by a fuel cell unit having at least one fuel cell, to which is connected a cooling circuit associated with a storage unit for storing and providing liquid water coolant to the fuel cell both under normal operating conditions and under frost conditions. The storage unit is adapted to provide a smaller amount of liquid water coolant under frost conditions than under normal operating conditions. The storage unit is formed with a reservoir that is intended for storing water coolant and is divided into two partial volumes that are separated by a heat-insulating layer In accordance with the invention, a fuel cell unit has at least one fuel cell, to which is connected a cooling circuit associated with a storage unit for storing and providing liquid water coolant to the fuel cell both under normal operating conditions and under frost conditions. Furthermore, the storage unit is adapted to provide a smaller amount of liquid water coolant under frost conditions than under normal operating conditions. By means of the storage unit of a fuel cell unit formed as noted above, it is possible to provide a smaller amount of liquid water coolant under frost conditions in relation to normal operating conditions. Therefore, only this smaller amount of water coolant must also be converted from its initially frozen state to its liquid state. Accordingly, the process of thawing this smaller amount of liquid water coolant necessitates less energy, and more importantly, also takes up less time. The fuel cell unit of the invention can therefore be started more rapidly under frost conditions than conventional fuel cell units.

It has been discovered that it is not at all necessary, under frost conditions, to provide a large amount of liquid water coolant as is the case under normal operating conditions. This is particularly due to the fact that the associated fuel cell unit having the at least one fuel cell already has a lower temperature under frost conditions than under normal operating conditions. Furthermore, during the start of the fuel cell unit, it is possible to convert additional water coolant from the frozen state to the liquid state and then likewise provide the same to the at least one fuel cell. The waste heat of the at least one fuel cell, already started, can be utilized very preferably for thawing this additional amount of water coolant. Therefore, a smaller amount of external energy is also required on the whole for melting the associated water coolant in a thus formed fuel cell unit of the invention. The remaining frozen water coolant can thus be molten by the warm water produced during the operation of the at least one fuel cell.

In order to enable the same, the storage unit is formed with a reservoir that is intended for storing water coolant and is divided into two partial volumes separated by a heat-insulating layer. In a thus divided reservoir for storing water coolant, it is possible to initially thaw only one of the two partial volumes in order to be able to start the associated fuel cell unit after a short period of time even under frost conditions.

A layer made of polytetrafluoroethylene (PTFE), such as Teflon® is preferably provided as the heat-insulating layer in the storage unit of such type. This type of a layer has a particularly high insulating effect and requires less space.

It is further advantageous to form a through-opening in the heat-insulating layer for the passage of water coolant from one partial volume into the other partial volume. Such a through-opening enables the molten water coolant to flow subsequently from the second partial volume into the first partial volume so that a suction or delivery device for liquid water coolant is required only in the first partial volume.

Furthermore, a heating element is also provided, preferably, in one of the partial volumes for thawing the water coolant located in the associated partial volume, while there is no such heating element located in the other partial volume. In this embodiment, the water coolant in the second partial volume is thawed merely by the liquid water coolant flowing back from the at least one fuel cell. Alternatively, it can be advantageous to provide the second partial volume with a heat exchanger, by which excess heat energy is transferred from the at least one fuel cell into this second partial volume.

The solution of the invention results in a functional improvement of the fuel cell unit since the fuel cell unit of the invention can supply electrical energy and also reach its operating temperature in a shorter period of time. Furthermore, in an appropriate embodiment of the fuel cell unit, less additional energy is required for heating up the water coolant, which has a positive effect on the energy balance of the fuel cell unit. This positive effect is achieved almost without any additional outlay.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
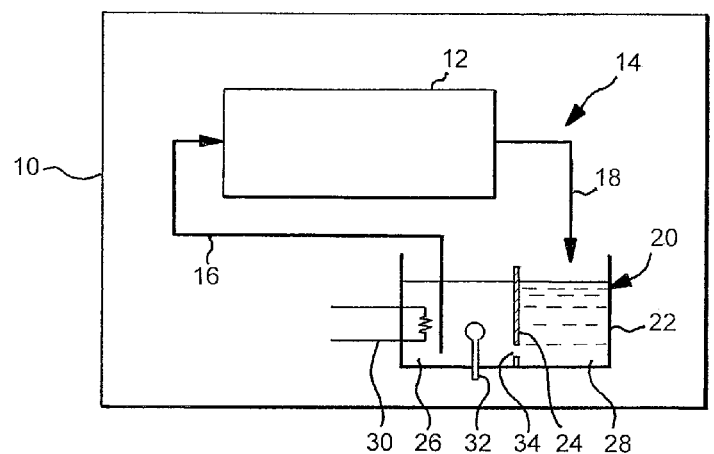
FIG. 1 is a diagram of a first exemplary embodiment of a fuel cell unit of the invention.

FIG. 1 shows an exemplary embodiment of a fuel cell unit 10 in which a cooling circuit 14 is connected to a fuel cell 12. The cooling circuit 14 has an inlet line 16 leading into the fuel cell 12 and an outlet line 18, by which a mixture of a water-immiscible fluid and a water coolant can be guided out of the fuel cell 12. Furthermore, a storage unit 20 is provided in which the mixture of the water-immiscible fluid and the water coolant can be separated and the water coolant as such can be stored in order to be subsequently resupplied to the fuel cell 12 by the inlet line 16. For this purpose, the storage unit 20 includes a reservoir 22 in which the water coolant is located.

An insulating layer 24 is formed in the reservoir 22. The insulating layer 24 is shaped as a partition wall and divides the reservoir 22 into a first partial volume 26 and a second partial volume 28. The partial volume 26 is the one from which the inlet line 16 withdraws water coolant for the fuel cell 12, while the water coolant coming from the fuel cell 12 by way of the outlet line 18 flows into the partial volume 28.

A heating element 30, by which the water coolant located in the partial volume 26 can be heated up, is located in the partial volume 26. A temperature sensor 32 is disposed in the partial volume 26 for controlling this heating process. A through-opening 34, through which the water coolant can flow from the partial volume 28 into the partial volume 26, is formed in the insulating layer 24.

It is possible, by means of the reservoir 22 formed in this way, to start the fuel cell unit 10 even under frost conditions when the portion of water coolant located in the partial volume 26 is thawed by the heating element 30. In the fuel cell unit 10 started in this way, the heated water coolant (and also the heated water-immiscible fluid) is then conveyed back through the fuel cell 12 by way of the outlet line 18, and this heated water coolant arrives into the partial volume 28 and then thaws the water coolant located here. The water coolant thawed in the partial volume 28 can then flow by way of the through-opening 34 into the partial volume 26 from where it can be brought to the fuel cell 12 by the inlet line 16.

Figure 2:
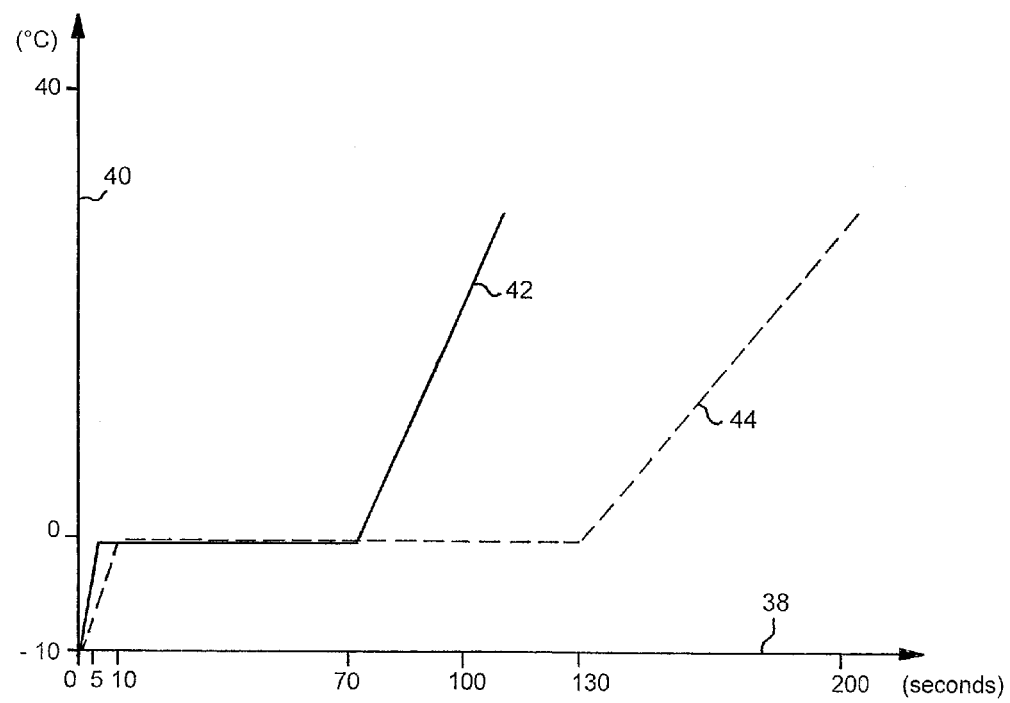
FIG. 2 is a graph showing the course of the temperature of water coolant versus time in the fuel cell unit shown in FIG. 1 and the one known in the prior art.

FIG. 2 is a graph showing how the time taken for starting the associated fuel cell 12 can be reduced by use of the associated method for operating the fuel cell unit 10. For this purpose, the time elapsed from the start of the thawing process of the water coolant in the reservoir 22 up to the actual start of the fuel cell 12 is plotted in seconds on the abscissa identified as the x-axis 38. The associated temperature of the water coolant is plotted in ° C. on the ordinate formed as a temperature axis 40. A continuous line 42 shows the course of the temperature over time during a process of melting only the water quantity located in the partial volume 26 shown in FIG. 1. In comparison thereto, the dashed line 44 shows the course of the temperature of the water coolant that is or would be located in the reservoir 22 in conventional fuel cell units.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell unit, comprising:
a fuel cell;
a cooling circuit operatively connected with the fuel cell and having an associated storage unit for storing and supplying liquid water coolant to the fuel cell;
wherein the storage unit comprises a reservoir operatively configured with a capacity for storing an amount of the water coolant required for both normal operating conditions and frost conditions; and
a heat-insulating layer operatively arranged in the reservoir to divide the reservoir into two partial volumes, a first partial volume being sufficient only for the frost conditions, wherein the heat-insulating layer is a partition wall.

2. The fuel cell unit according to claim 1, wherein the heat-insulating layer is a polytetrafluoroethylene layer.

3. The fuel cell unit according to claim 1, wherein the heat-insulating layer includes a through-opening operatively configured for water coolant to pass from one partial volume into the other partial volume.

4. The fuel cell unit according to claim 2, wherein the heat-insulating layer includes a through-opening operatively configured for water coolant to pass from one partial volume into the other partial volume.

5. The fuel cell unit according to claim 1, further comprising a heating element operatively configured for thawing water coolant located in the first of the two partial volumes.

6. The fuel cell unit according to claim 2, further comprising a heating element operatively configured for thawing water coolant located in the first of the two partial volumes.

7. The fuel cell unit according to claim 3, further comprising a heating element operatively configured for thawing water coolant located in the first of the two partial volumes.

8. The fuel cell unit according to claim 5, wherein the heating element is arranged in the first of the two partial volumes for thawing the water coolant located therein.

* * * * *